US006778297B1

(12) United States Patent
Fujiwara

(10) Patent No.: US 6,778,297 B1
(45) Date of Patent: Aug. 17, 2004

(54) IMAGE PROCESSING APPARATUS, METHOD, AND COMPUTER PROGRAM PRODUCT

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/547,274

(22) Filed: Apr. 11, 2000

(30) Foreign Application Priority Data

| Apr. 12, 1999 | (JP) | ............................................ 11-104584 |
| Apr. 12, 1999 | (JP) | ............................................ 11-104585 |
| Feb. 14, 2000 | (JP) | ....................................... 2000-035455 |
| Feb. 14, 2000 | (JP) | ....................................... 2000-035456 |

(51) Int. Cl.[7] .......................... G06K 15/00; G06K 9/66; G06K 9/36
(52) U.S. Cl. ........................ 358/1.9; 358/2.1; 382/190; 382/282
(58) Field of Search ......................... 358/1.9, 447, 529, 358/530, 538, 298, 520, 515, 2.1; 382/173, 195, 266, 282, 190, 176, 292, 181

(56) References Cited

U.S. PATENT DOCUMENTS 5,850,293 A    12/1998    Suzuki et al. ............... 358/298

| 6,175,662 B1 | * | 1/2001 | Toda | ........................ 382/282 |
| 6,259,813 B1 | * | 7/2001 | Ouchi | ........................ 382/195 |
| 6,370,278 B1 | * | 4/2002 | Waguri | ........................ 382/266 |

FOREIGN PATENT DOCUMENTS

| JP | 02-110677 A | 4/1990 |
| JP | 03-089677 A | 4/1991 |
| JP | 04-126461 A | 4/1992 |
| JP | 05-219365 A | 8/1993 |
| JP | 06-038054 A | 2/1994 |
| JP | 08-018812 A | 1/1996 |

* cited by examiner

Primary Examiner—Kimberly Williams
Assistant Examiner—Thomas J. Lett
(74) Attorney, Agent, or Firm—Sidley Austin Brown & Wood LLP

(57) ABSTRACT

An image processing apparatus including a minimum selector, a maximum selector, and a detector for processing image data having a plurality of color components expressing the image. The minimum selector selects an image data of a minimum value color component from the image data having a plurality of color components. The maximum selector selects an image data of a maximum value color component from the image data having a plurality of color components. The detector detects an edge existing in the image based on the image data of two color components selected by the minimum selector and the maximum selector.

9 Claims, 11 Drawing Sheets

FIG. 3

|  |  | -1/4 |  |  |
|---|---|---|---|---|
|  |  |  |  |  |
| -1/4 |  | 1 |  | -1/4 |
|  |  |  |  |  |
|  |  | -1/4 |  |  |

IMAGE PROCESSING APPARATUS, METHOD, AND COMPUTER PROGRAM PRODUCT

This application is based on Japanese Patent Application Nos. 11-104584, 11-104585, 2000-35455, and 2000-35456, the contents of which are hereby incorporated by reference.

BACKGROUND OF THE INVENTION

1. Field of the Invention

The invention relates to an apparatus, a method and a computer program product for processing image data, in particular, to the edge detection.

2. Description of Related Art

Printed materials generally have halftone images, i.e., images described by numerous halftone dots. When images of printed matters or documents are captured by scanning and outputted by a printer, Moiré patterns appear depending on the relation between spatial frequencies of halftone dots and scanning cycles or dither pattern cycles during their dither processes.

A typical conventional digital copying machine detects a halftone dot region where halftone dots exist, for applying the smoothing process to the halftone dot region to make the edges of the dots less conspicuous. The copying machine also applies the edge enhancement process to character elements to make the character elements reproduced sharper.

However, the method does not function properly when character elements exist in the halftone dot region. For example, the reproducibility of the character elements deteriorates if the smoothing process is applied to the halftone dot region. On the other hand, minute edges of halftone dots will be enhanced causing the Moiré effect and deterioration of picture quality if the edge enhancement process is applied to the same region.

There is another method in which only the edges of character elements are detected and the enhancement process is applied to the detected edges in order to reproduce the character elements more sharply. The edge detection is based on the lightness gradient or the density gradient.

The lightness data used for the edge detection is calculated by adding the RGB-image data at a fixed rate. More specifically, the lightness data V is calculated by the following formula, where coefficients $k_1$, $k_2$ and $K_3$ are constants:

$$V = k_1 \times R + k_2 \times G + k_3 \times B$$

However, the coefficient $k_2$ or the weight of the G-image data is set heavier than others in order to correspond to the human visual characteristics. Therefore, the lightness gradient between the background and the character elements will be detected smaller than usual if black character elements exist against a red background or blue character elements exist against a white background. Accordingly, the edge detection accuracy deteriorates when character elements exist against a background of a certain color.

In addition, Publication of Unexamined Japanese Patent Application No. 6-38054 discloses a method of the edge detection based on the density gradient. The density data used in the method is the image data of magenta which is the closest to the human visual characteristics among the CMY-image data obtained by logarithmic conversion of the RGB-image data. Consequently, a problem of difficulty in detecting edges may occur if black character elements exist against a magenta background. In other words, the edge detection accuracy deteriorates when character elements exist against a background of a certain color as well.

SUMMARY OF THE INVENTION

It is an object of the present invention to provide an image processing apparatus including a minimum selector, a maximum selector, and a detector for processing image data having a plurality of color components expressing the image. The minimum selector selects an image data of a minimum value color component from the image data having a plurality of color components. The maximum selector selects an image data of a maximum value color component from the image data having a plurality of color components. The detector detects an edge existing in the image based on the image data of two color components selected by the minimum selector and the maximum selector.

A further object of the invention is to provide an image processing method including a minimum value data selecting step, a maximum value data selecting step, and a detecting step for detecting an edge segment existing in an image based on image data having a plurality of color components expressing the image. The minimum value data selecting step is for selecting an image data of a minimum value color component from the image data having a plurality of color components. The maximum value data selecting step is for selecting an image data of a maximum value color component from the image data having a plurality of color components. The detecting step is for detecting an edge existing in the image based on the image data of two color components selected by the minimum value data selecting step and the maximum value data selecting step.

Still a further object of the invention is to provide a computer program product for executing a minimum value data selecting step, a maximum value data selecting step, and a detecting step to detect an edge segment existing in an image based on image data having a plurality of color components expressing the image. The minimum value data selecting step is for selecting an image data of a minimum value color component from the image data having a plurality of color components. The maximum value data selecting step is for selecting an image data of a maximum value color component from the image data having a plurality of color components. The detecting step is for detecting an edge existing in the image based on the image data of two color components selected by the minimum value data selecting step and the maximum value data selecting step.

Another object of the invention is to provide an image processing apparatus including a lightness calculator, a saturation calculator, and a detector for processing image data expressing an image. The lightness calculator calculates a lightness component from the image data. The saturation calculator calculates a saturation component from the image data. The detector detects an edge existing in the image based on the lightness component and the saturation component calculated by the lightness calculator and the saturation calculator.

A further object of the invention is to provide an image processing method including a lightness calculating step, a saturation calculating step, and a detecting step for detecting an edge segment existing in an image based on image data expressing the image. The lightness calculating step is for calculating a lightness component from the image data. The saturation calculating step is for calculating a saturation component from the image data. The detecting step is for detecting an edge existing in the image based on the lightness component and the saturation component calculated by the lightness calculating step and the saturation calculating step.

Still a further object of the invention is to provide a computer program product for executing a lightness calculating step, a saturation calculating step, and a detecting step to detect an edge segment existing in an image based on image data expressing the image. The lightness calculating step is for calculating a lightness component from the image data. The saturation calculating step is for calculating a saturation component from the image data. The detecting step is for detecting an edge existing in the image based on the lightness component and the saturation component calculated by the lightness calculating step and the saturation calculating step.

A further object of the invention is to provide an image processing apparatus including a saturation calculator and a detector for processing image data expressing an image. The saturation calculator calculates a saturation component from the image data, and the detector detects an edge existing in the image based on the saturation component of the image data calculated by the saturation calculator.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 3 is an example of a derivative filter;

DETAILED DESCRIPTION OF THE EMBODIMENTS

The embodiments of this invention will be described below with reference to the accompanying drawings.

Embodiment 1

Figure 1:
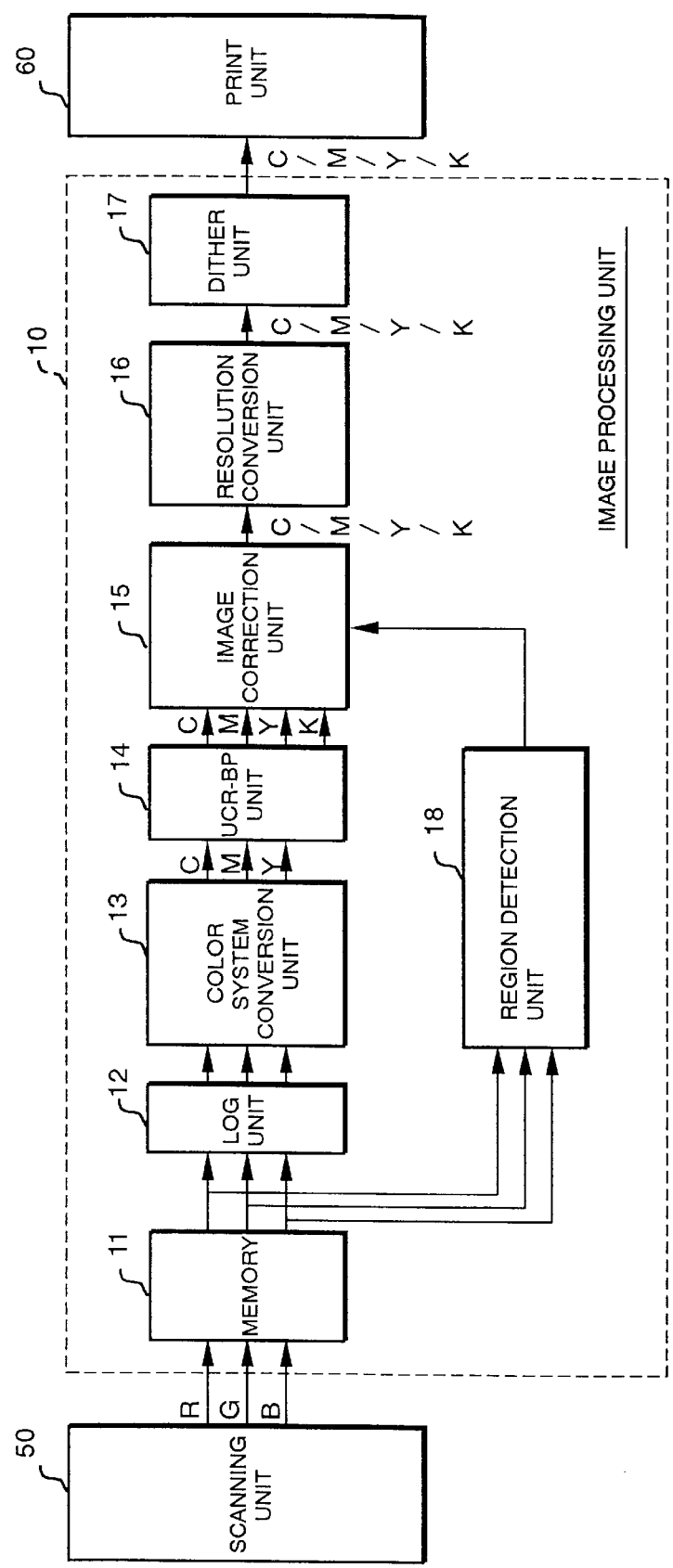
FIG. 1 is a block diagram of a digital copying machine according to embodiment 1 of the invention.

The digital copying machine shown in FIG. 1 includes a scanning unit 50 for scanning the image of the document, an image processing unit 10 for applying various processes on the image data, and a print unit 60 for printing output data on a paper. The image processing unit 10 includes a memory 11, a LOG unit 12, a color system conversion unit 13, a UCR (under color removal)-BP (black paint) unit 14, an image correction unit 15, a resolution conversion unit 16, a dither unit 17, and a region detection unit 18. Since the basic control circuit and mechanical constitutions of the digital copying machine are similar to conventional machines, so that their descriptions are not presented here.

Now, the outline of the operations of the image processing unit 10 is described, following the flow of the image data.

First, RGB-image data from the scanning unit 50 is stored in the memory 11. The RGB-image data is then read from the memory 11 in synchronization with the print timing signal from the print unit 60 and inputted into the LOG unit 12 and the region detection unit 18.

The LOG unit 12 logarithmically converts the RGB-image data. The logarithmic data is converted into CMY-image data in the color system conversion unit 13. The CMY-image data is converted into CMYK-image data in the UCR-BP unit 14. The CMYK-image data is then inputted into the image correction unit 15.

In the meantime, the region detection unit 18 detects the features of the RGB-image data. The detected features are inputted into the image correction unit 15.

The image correction unit 15 applies the filtering process according to the features detected by the region detection unit 18 to the CMYK-image data from the UCR-BP unit 14 in addition to normal corrections such as the gamma correction. Next, the resolution of the image data is converted into a value greater than the scanning resolution of the scanning unit 50 in the resolution conversion unit 16. The image data is then compared with the dither table, and binarized in the dither unit 17. In other words, the image data consisting of multiple values is converted into a binary image data. The binary image data is inputted into the print unit 60 via a printer video interface (not shown) to be printed on printing media such as papers and OHP sheets.

Next, the region detection unit 18 is described in detail.

Figure 2:
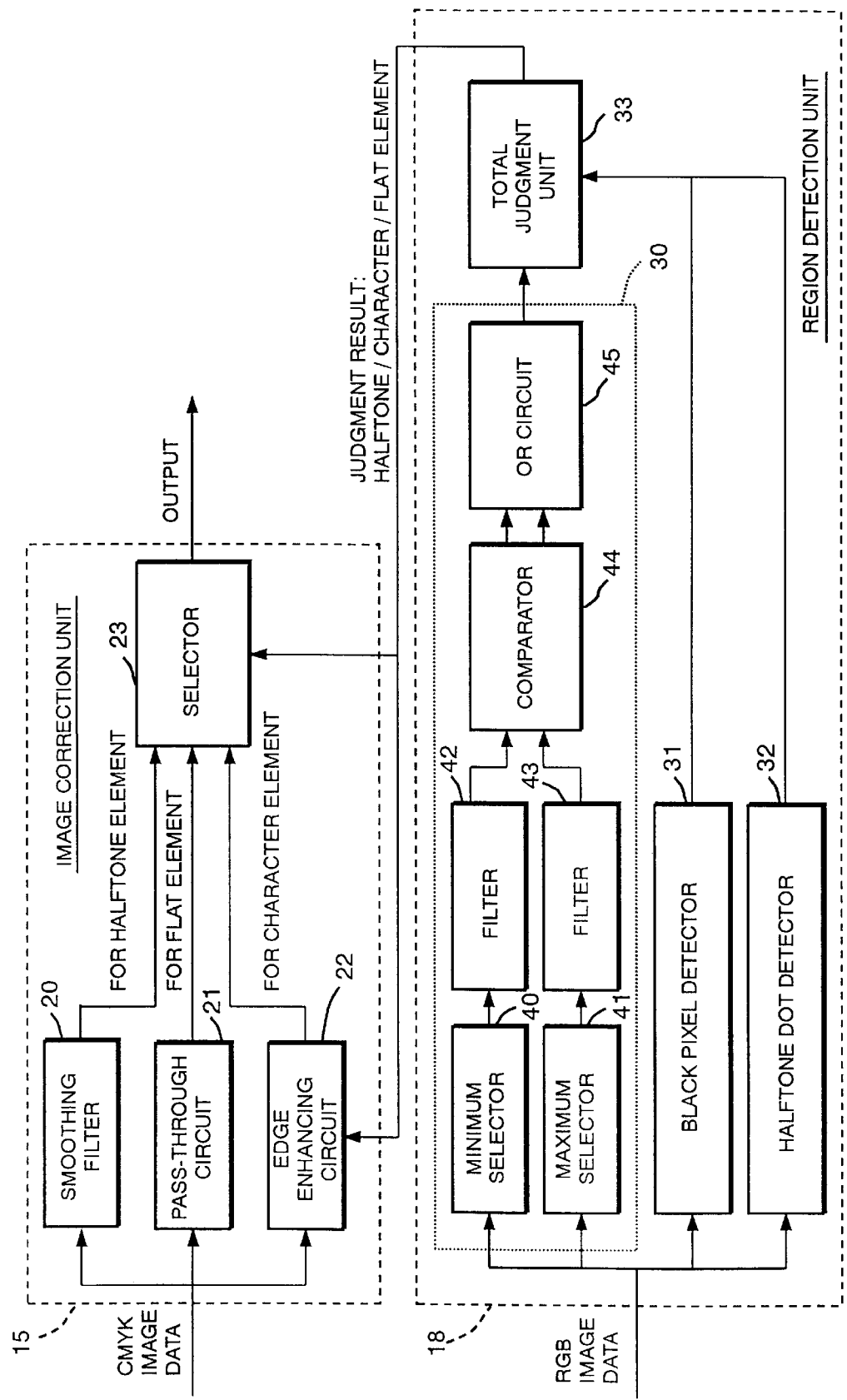
FIG. 2 is a block diagram of an image correction unit and a region detection unit of the digital copying machine.

The region detection unit 18 includes an edge detector 30, a black pixel detector 31, a halftone dot detector 32, and a total judgment unit 33 as shown in FIG. 2. The edge detector 30 includes a minimum selector 40, a maximum selector 41, derivative filters 42 and 43, a comparator 44, and an OR circuit 45 for identifying edges of character elements. The character elements consist of letters and fine lines in RGB-image data. The derivative filter 42 and the derivative filter 43 are the same.

The RGB-image data read from the memory 11 is entered into the minimum selector 40, the maximum selector 41, the black pixel detector 31, and the halftone dot detector 32 respectively.

The minimum selector 40 selects minimum value data Dmin, or the data of the smallest value from the RGB-image data. On the other hand, the maximum selector 41 selects maximum value data Dmax, or the data of the largest value from the RGB-image data. The minimum value data Dmin and the maximum value data Dmax are inputted into the derivative filter 42 and the derivative filter 43 respectively.

Figure 3:
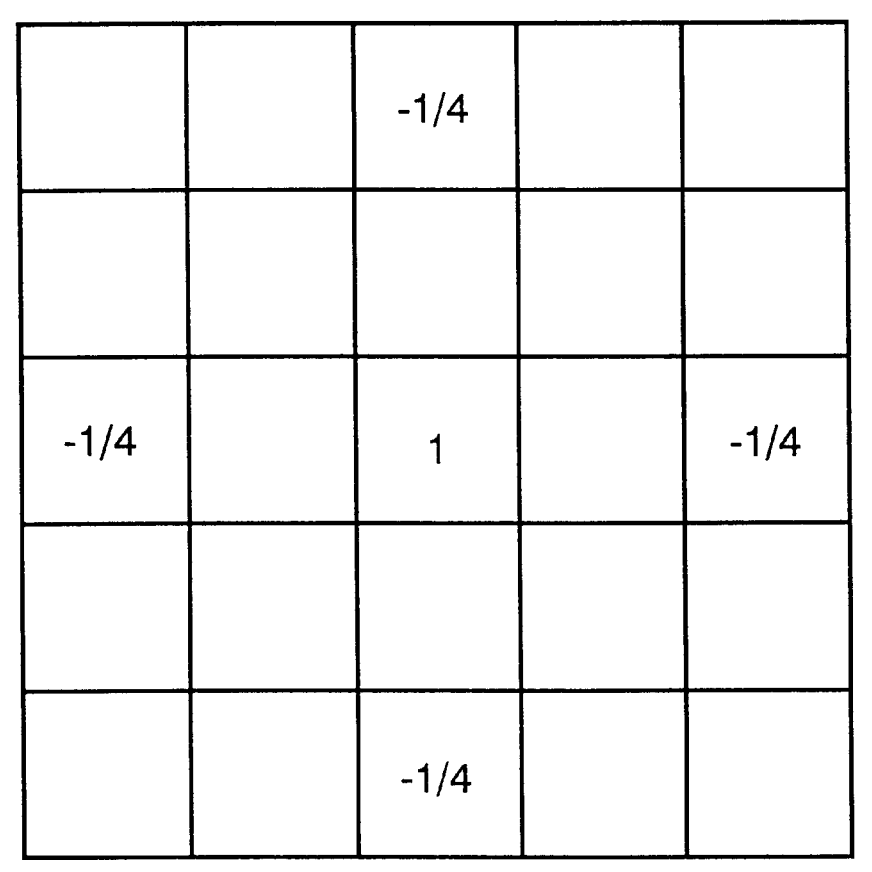

The output data of the derivative filters 42, 43 are obtained by matrix calculations and are corresponding to gradients of the input data. The matrix calculation is based on the data of the pixels contained in the specified region whose center is occupied by the target pixel and the coefficients of the derivative filters. FIG. 3 shows an example of the derivative filters. The derivative filter is a matrix of five rows by five columns and corresponds to five pixels by five pixels. When such a filter is used as the derivative filters 42 and 43, the output Lmin of the derivative filter 42 and the output Lmax of the derivative filter 43 can be obtained from the following formulae:

$$Lmin=(4\times Dmin_{33}-Dmin_{13}-Dmin_{31}-Dmin_{35}-Dmin_{53})/4$$

$$Lmax=(4\times Dmax_{33}-Dmax_{13}-Dmax_{31}-Dmax_{35}-Dmax_{53})/4$$

wherein the suffix numbers 33, 13, 31, 35 and 53 represent the locations of pixels in the filter. For example, $Dmin_{33}$ represents the minimum value data of the target pixel located at the cross point of the third row and the third column, i.e., the center of the matrix.

The absolute values of the outputs Lmin and Lmax of the derivatives 42 and 43 are large when the target pixel belongs to an edge segment and are small when the target pixel belongs to a non-edge segment. The derivative filters 42, 43 are not limited to the filter shown in FIG. 3, they can be derivative filters that correspond to three pixels× three pixels. Similarly, the coefficients of the derivative filters are not limited to the values shown in FIG. 3.

The outputs Lmin and Lmax of the derivatives 42 and 43 are inputted into the comparator 44. The comparator 44 outputs signal "1" when the absolute value of the output Lmin is equal or greater than the threshold value and outputs signal "0" when it is less than the threshold value. In addition, the comparator 44 outputs signal "1" when the absolute value of Lmax is equal to or greater than the threshold value, and outputs signal "0" when it is less than the threshold value. The signal "1" indicates that the target pixel belongs to an edge segment, and the signal "0" indicates that the target pixel belongs to a non-edge segment. The output of the comparator 44 is inputted into the OR circuit 45.

The OR circuit 45 produces a logical sum of the outputs of the comparator 44. Therefore, when the signal "1" is detected based on at least either one of the minimum value data Dmin and the maximum value data Dmax, the target pixel is finally identified to be belonging to the edge segment. The identification result is inputted into the total judgment unit 33.

Now, the reason why the edge detection is executed based on the minimum value data Dmin and the maximum value data Dmax is described.

Figure 4:
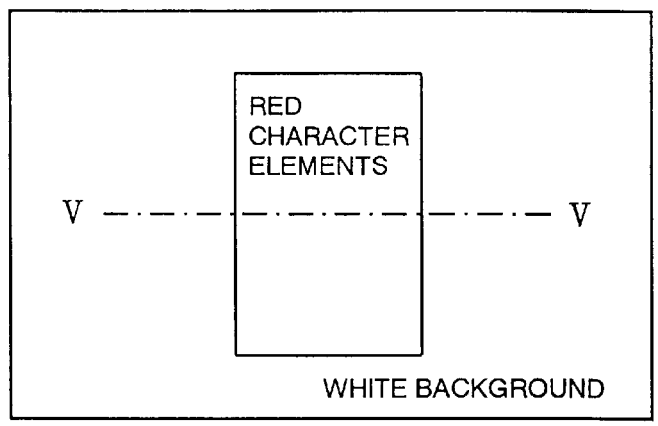
FIG. 4 is an example image containing a white background and red character elements.
Figure 5A:
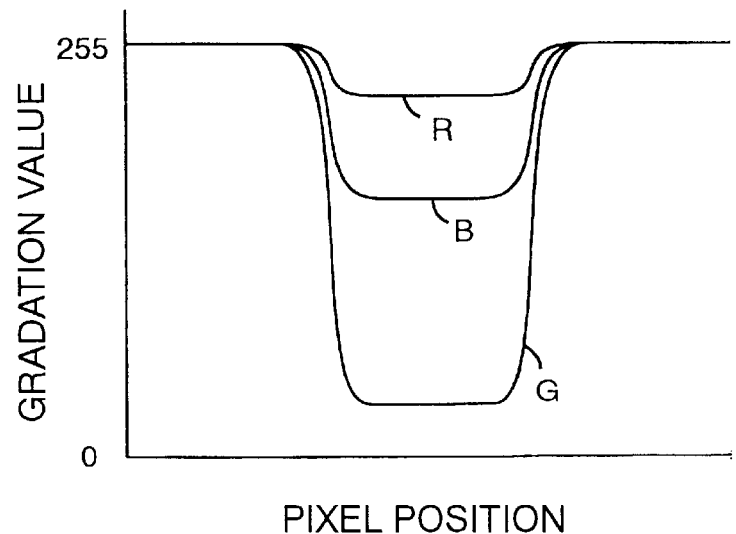
FIG. 5A and FIG. 5B are graphs of assistance in explaining the edge detection of the image shown in FIG. 4.

First, an image with a white background and red character elements as shown in FIG. 4 is cited. FIG. 5A indicates the relation between the gradation value of the RGB-image data and the pixel position on line V—V in FIG. 4. The gradient of the G-image data is the largest, and the gradient of the R-image data is the smallest. The minimum value data Dmin is the G-image data and the maximum value data Dmax is the R-image data. Therefore, the minimum value data Dmin is compared with the lightness data V.

Figure 5B:
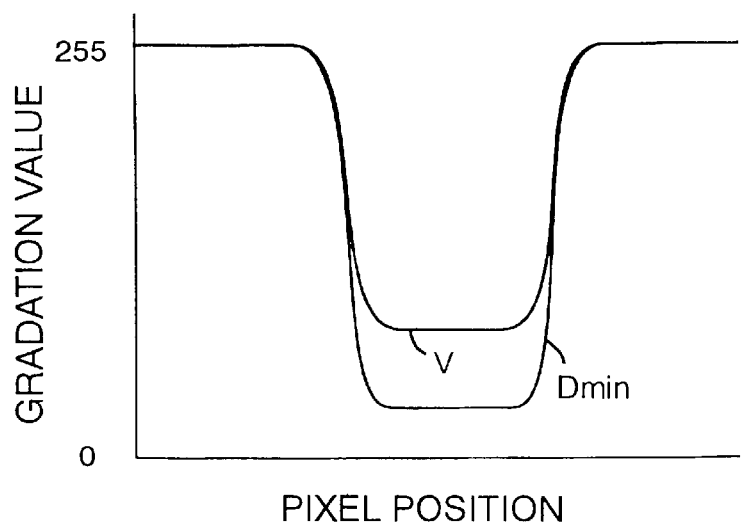

FIG. 5B indicates the relation between the pixel position and the minimum value data Dmin as well as the gradation value of the lightness data V. The minimum value data Dmin shows a sufficiently large gradient. The lightness data V, because its G-image data has a heavier weight, also shows a sufficiently large gradient similar to the minimum value data Dmin. Thus, it is possible to identify edges of the red character elements against the white background based on either the minimum value data Dmin or the lightness data V. However, the gradient of the minimum value data Dmin is greater than the gradient of the lightness data V. Thus, the edge detection based on the minimum value data Dmin is more accurate than the detection based on the lightness data V. Incidentally, the maximum value of the gradation is 255 and the gradation number is 256.

Figure 6:
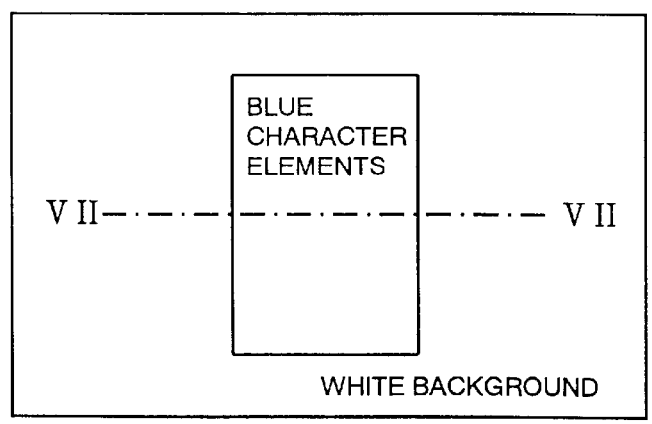
FIG. 6 is an example image having a white background and blue character elements.
Figure 7A:
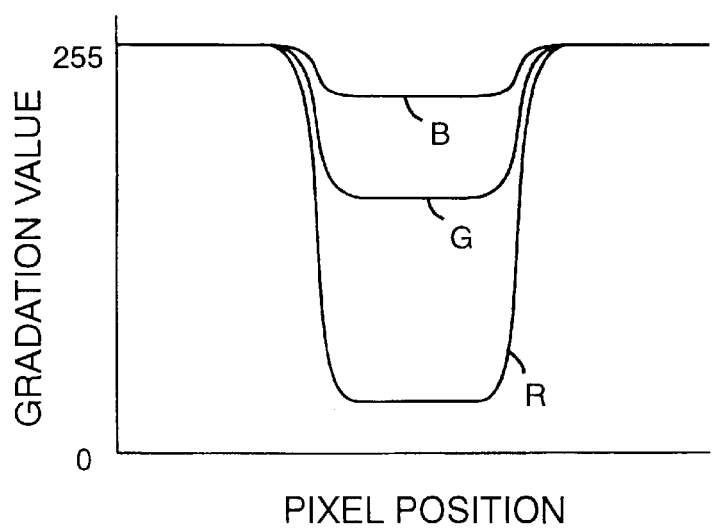
FIG. 7A and FIG. 7B are graphs of assistance in explaining the edge detection of the image shown in FIG. 6.

Next, an image with a white background and blue character elements as shown in FIG. 6 is cited. FIG. 7A indicates the relation between the gradation value of the RGB-image data and the pixel position on line VII—VII in FIG. 6. The gradient of the R-image data is the largest and the gradient of the B-image data is the smallest. The minimum value data Dmin is the R-image data, and the maximum value data Dmax is the B-image data. Therefore, the minimum value data Dmin is compared with the lightness data V.

Figure 7B:
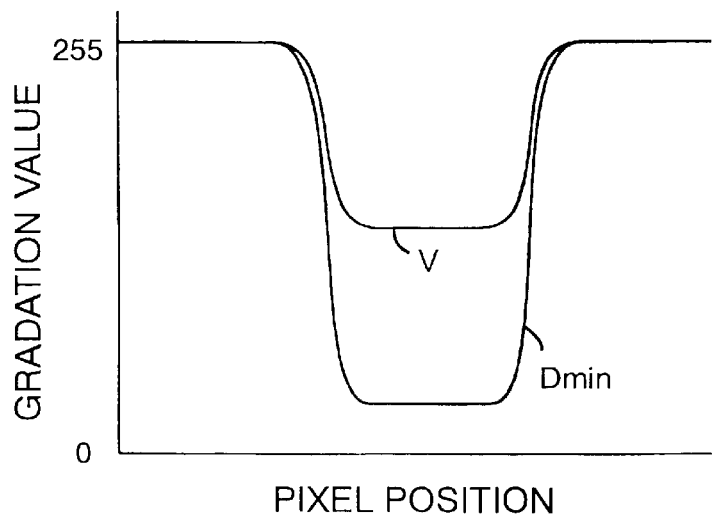

FIG. 7B indicates the relation between the pixel position and the minimum value data Dmin as well as the gradation value of the lightness data V. Since the gradient of the minimum value data Dmin is sufficiently large, edges of the blue character elements against the white background can be identified with a high accuracy. On the other hand, the lightness data V shows a relatively small gradient compared to the minimum value data Dmin because its G-image data, which has a relatively small gradient, has a heavier weight. Therefore, it may not be able to identify the edge if it is merely based on the lightness data V.

Figure 8:
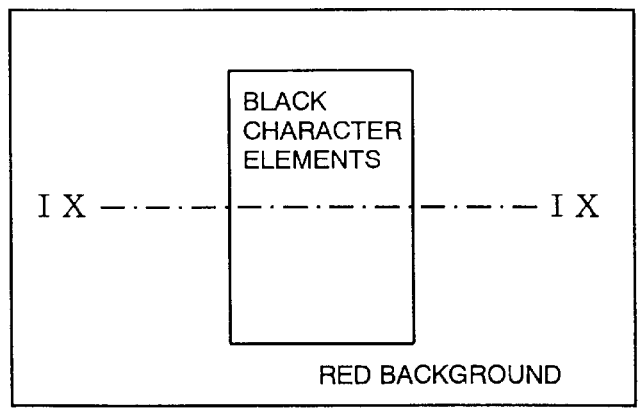
FIG. 8 is an example image having a red background and black character elements.
Figure 9A:
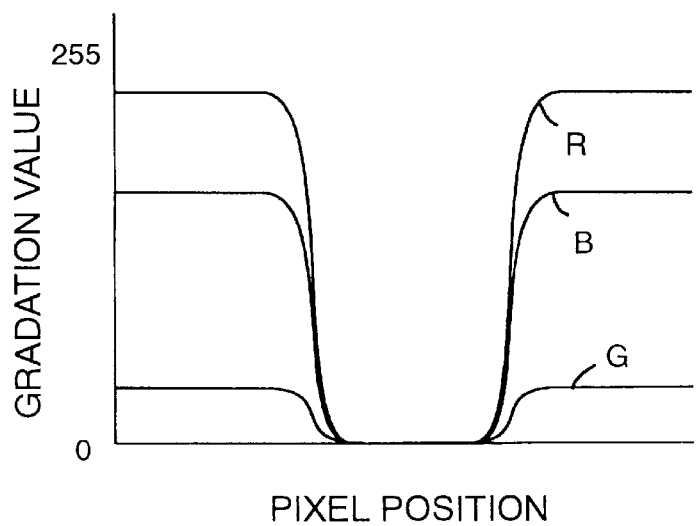
FIG. 9A and FIG. 9B are graphs of assistance in explaining the edge detection of the image shown in FIG. 8.

Lastly, an image having a red background and black character elements as shown in FIG. 8 is cited. FIG. 9A indicates the relation between the gradation value of the RGB-image data and the pixel position on line IX—IX in FIG. 8. The gradient of the R-image data is the largest, and the gradient of the G-image data is the smallest. Since the minimum value data Dmin is the G-image data, the maximum value data Dmax is the R-image data, the maximum value data Dmax is compared with the lightness data V.

Figure 9B:
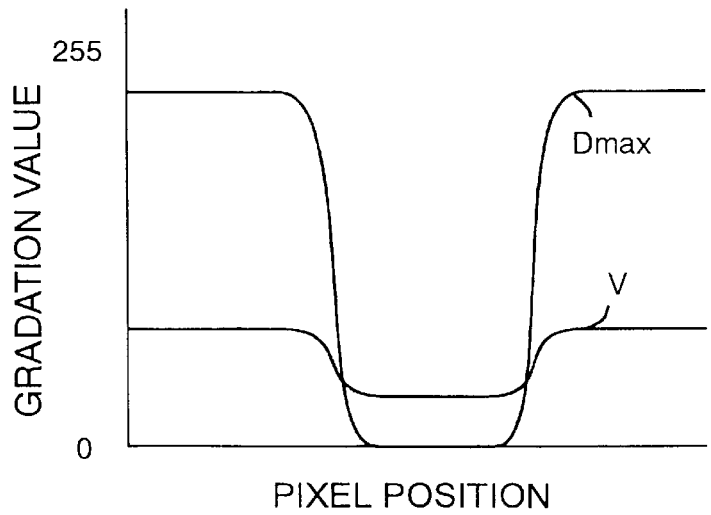

FIG. 9B indicates the relation between the pixel position and the maximum value data Dmax as well as the gradation value of the lightness data V. Since the gradient of the maximum value data Dmax is sufficiently large, edges of the black character elements against the red background can be identified with a high accuracy. On the other hand, the lightness data V shows a much smaller gradient compared to the maximum value data Dmax because its G-image data, which has a small gradient, has a heavier weight. Therefore, it is difficult to identify the edges based on the lightness data V alone.

As stated above, the edge detection is based on both the minimum value data Dmin and the maximum value data Dmax. It is executable with a high accuracy and certainty regardless of the combination of the color of the background and the color of the character elements. Thus, edges of character elements belonging to a halftone dot region can be identified with certainty even if the halftone dot region is colored.

The black pixel detector 31 detects the color of the target pixel based on the RGB-image data read from the memory 11. Specifically, the target pixel is identified as black when the value obtained by subtracting the minimum value data Dmin from the maximum value data Dmax of the target pixel is equal to or smaller than the threshold value. On the other hand, if the value is greater than the threshold value, the target pixel is identified as color. The detection result is inputted into the total judgment unit 33.

The halftone dot detector 32 generates the lightness data V from the RGB-image data stored in the memory 11 based on the following formula, where coefficients $k_1$, $k_2$ and $K_3$ are constants:

$$V = k_1 \times R + k_2 \times G + k_3 \times B$$

Next, it is determined whether each pixel is an isolated point based on the lightness data V. For example, if the difference between the lightness data $V_i$ of each of neighboring pixels and the lightness data $v_0$ of a target pixel is greater than the specified threshold value $V_T$ as shown in the formula below, the target pixel is identified as an isolated point:

$$(V_i - V_0) > V_T$$

wherein the symbol "i" is a positive integer between 1 through N that corresponds to the number of the neighboring pixels to be set.

Next, the number of pixels that are identified as isolated points existing in an area greater than an area used for the judgement of the isolated point is counted. For example, the area for counting may consist of 20 pixels×20 pixels. If the number of the isolated points is not less than a certain number, e.g., 30, the target pixel is identified as belonging to the halftone dot region. On the other hand, if the number of the isolated points is under the certain number, the target pixel is identified as belonging to the non-halftone dot region. In this way, every pixel is judged whether it belongs to the halftone dot region.

The judgment result is inputted into the total judgment unit 33. The detection of halftone dots can also be executed by means of identifying a nonwhite background or a white background in lieu of the above-described method based on isolation points.

The total judgment unit 33 classifies the target pixel to either the character, halftone, or flat element, depending on the detection results of the edge detector 30 and the halftone dot detector 32. The character element corresponds to a case where the target pixel belongs to the edge segment. The halftone element corresponds to a case where the target pixel belongs to the halftone dot region and the non-edge segment. The flat element corresponds to a case where the target pixel belongs to the non-halftone dot region and the non-edge segment. The classification result of the total judgment unit 33 and the detection result of the black pixel detector 31 are inputted into the image correction unit 15.

Next, the image correction unit 15 is described in detail.

The image correction unit 15 includes a smoothing filter 20, a pass-through circuit 21, an edge enhancing circuit 22, and a selector 23 as shown in FIG. 2. The edge enhancing circuit 22 receives the detection result of the black pixel detector 31, and the selector 23 receives the classification result of the total judgment unit 33.

The CMYK-image data from The UCR-BP unit 14 is inputted into the selector 23 via the smoothing filter 20, the pass-through circuit 21, and the edge enhancing circuit 22. The selector 23 selects either one of the outputs of the smoothing filter 20, the pass-through circuit 21, or the edge enhancing circuit 22 depending on the classification result. More specifically, the edge enhancing process is applied to the image data of character elements. Image data that belong to halftone elements are smoothed in order to prevent the Moiré effect from occurring. The filtering process is not applied to data that belong to flat elements. The selected output is sent to the resolution conversion unit 16.

The edge enhancement operation is a matrix calculation of the CMYK-image data of pixels contained in the specific area, at the center of which the target pixel is located, and Laplacian, which is the second derivative operator. It intensifies the density of the inside area of an edge segment while lowering the density of the outside area of the edge segment. There is a possibility of forming a white fringe along the edge segment in case of an image having character elements and a colored background. In order to suppress it, the edge enhancing circuit 22 adjusts the enhancement of the edge depending on the detection result of the black pixel detector 31. For example, in case of an image with character elements and a colored background, the enhancement on the outside area of the edge segment is weakened compared to an image with black or colored character elements and a white background. Alternatively, no enhancement on the outside area of the edge segment takes place.

As described above, the edge detection is executed based on both the minimum value data and the maximum value data. Therefore, edges of character elements in the halftone dot region can be identified with certainty even if the halftone dot region is colored. In other words, even in case of a colored image data, the halftone elements and the character elements existing in the halftone dot region can be divided with certainty. It is, thus, possible to apply the smoothing process only to the halftone elements in order to prevent the Moire effect from occurring, and the enhancement process only to the edges of the character elements to reproduce the character elements more sharply.

Embodiment 2

The digital copying machine according to embodiment 2 is different from the digital copying machine according to embodiment 1 with reference to the edge detector of the region detection unit 18. More specifically, the edge detection is executed based on the lightness data V and the saturation data W instead of the maximum value data Dmax and the minimum value data Dmin. Since the constitutions of the digital copying machine except the edge detector are identical to those of embodiment 1, their descriptions are not repeated here.

Figure 10:
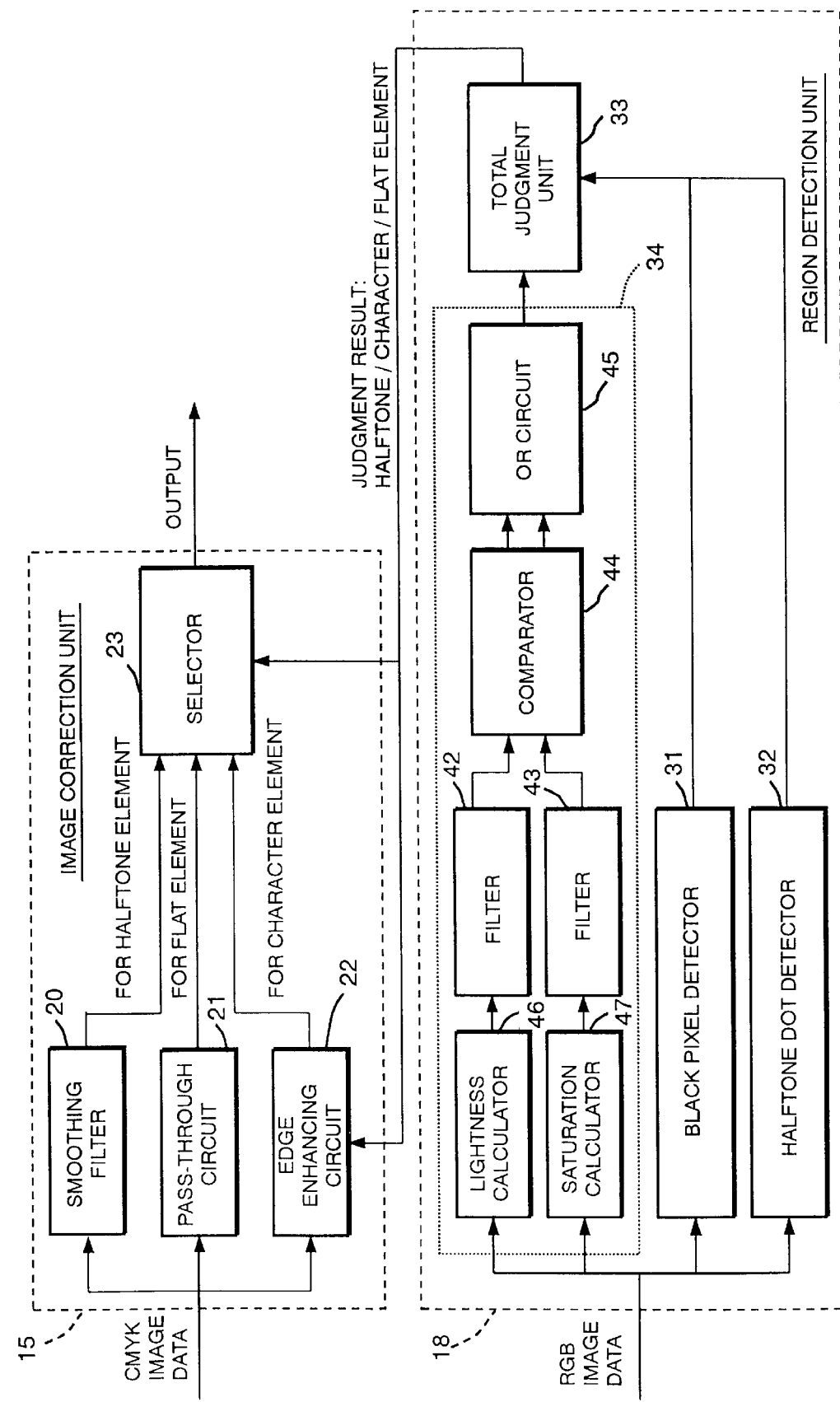
FIG. 10 is a block diagram of an image correction unit and a region detection unit of a digital copying machine according to embodiment 2 of the invention.

The edge detector 34 shown in FIG. 10 includes a lightness calculator 46, a saturation calculator 47, the derivative filter 42, the derivative filter 43, the comparator 44 and the OR circuit 45. The lightness calculator 46 and the saturation calculator 47 are used in lieu of the minimum selector 40 and the maximum selector 41 used in embodiment 1.

Now, the operations of the region detection unit 18 are described, following the flow of the image data.

The RGB-image data read from the memory 11 is inputted into the lightness calculator 46 and the saturation calculator 47.

The lightness calculator 46 generates the lightness data V from the RGB-image data based on the following formula similar to that of embodiment 1:

$$V = k_1 \times R + k_2 \times G + k_3 \times B$$

Figure 11:
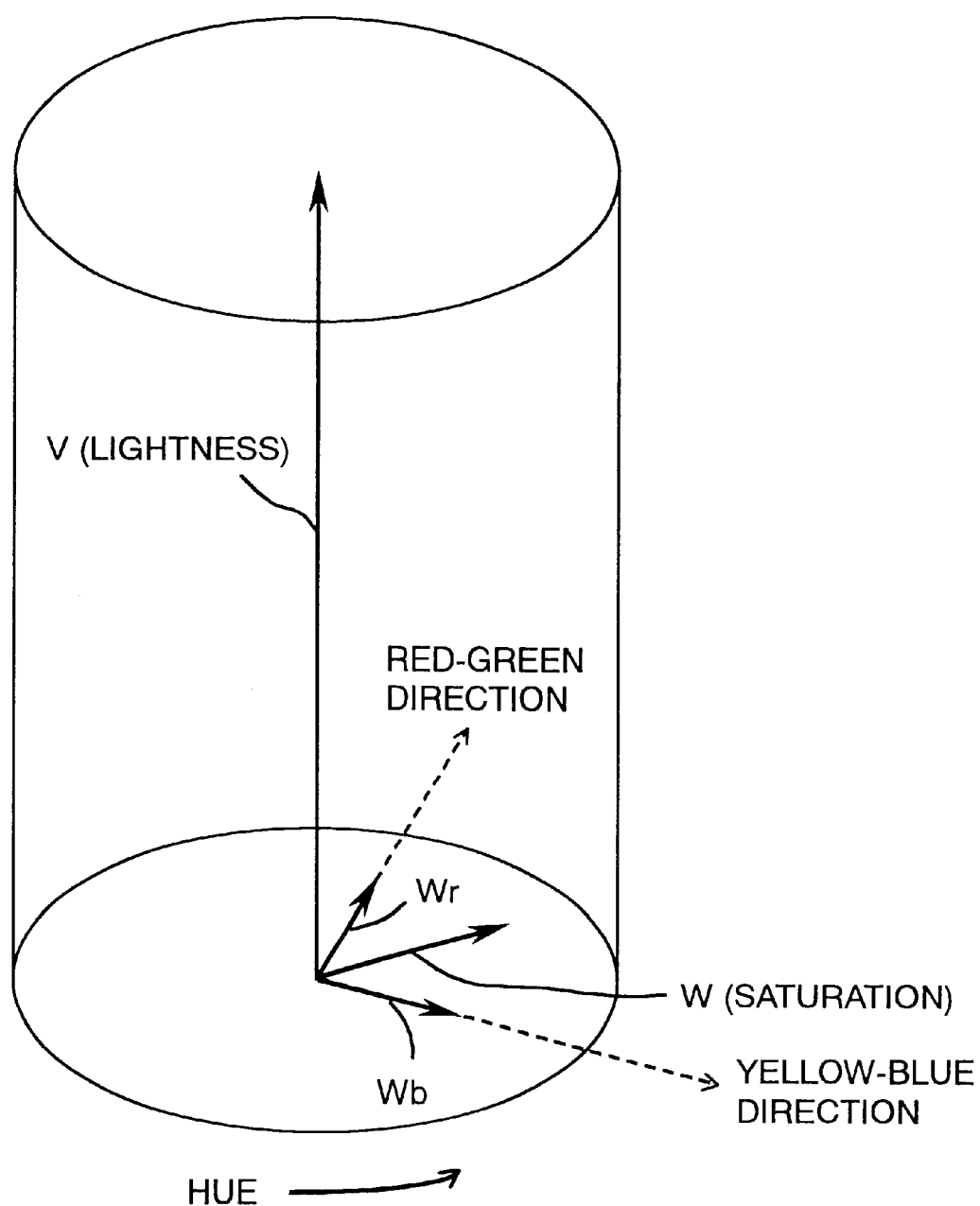
FIG. 11 is a conceptual diagram of the color space of assistance in explaining the lightness, the saturation and the hue.

The saturation calculator 47 generates the saturation data W from the RGB-image data. The saturation data W is the length of the vector synthesized from the component Wr in the red-green direction and the component Wb in the yellow-blue direction as shown in the conceptual diagram of the color space of FIG. 11. The red-green direction and the yellow-blue direction intersect perpendicularly with each other with respect to the hue.

The components Wr and Wb are calculated according to the following formulae:

$$Wr = R - V = (1-k_1) \times R - k_2 \times G - k_3 \times B$$

$$Wb = B - V = -k_1 \times R - k_2 \times G - (1-k_3) \times B$$

Since the saturation data W is the length of the vector generated by synthesizing the component Wr and the component Wb, it is calculated according to the following formula:

$$W = (Wr^2 + Wb^2)^{1/2}$$

The coefficients $k_1$, $k_2$, and $k_3$ generally depend on the characteristics of the CCD device. For example, the values are $k_1 : k_2 : k_3 = 3 : 6 : 1$ and the G-image data is weighted heavier in order to match them with the human visual characteristics.

If 0.3, 0.6 and 0.1 are assigned to the coefficients $k_1$, $k_2$, and $k_3$ the lightness data V, the component Wr and the component Wb are calculated as follows:

$$V = 0.3 \times R + 0.6 \times G + 0.1 \times B$$

$$Wr = R - V = (1-0.3) \times R - 0.6 \times G - 0.1 \times B$$

$$Wb = B - V = -0.3 \times R - 0.6 \times G - (1-0.1) \times B$$

The calculated lightness data V and saturation data W are inputted into the derivative filters 42 and 43. The outputs $L_V$ and $L_W$ of the derivative filters 42 and 43 correspond to the gradient of the input data, i.e., the lightness data V and the saturation data W. Thus, the outputs $L_V$ and $L_W$ are calculated according to the following formulae as in embodiment 1:

$$L_V = (4 \times V_{33} - V_{13} - V_{31} - V_{35} - V_{53})/4$$

$$L_W = (4 \times W_{33} - W_{13} - W_{31} - W_{35} - W_{53})/4$$

The absolute values of the outputs $L_V$ and $L_W$ of the derivatives 42 and 43 are large when the target pixel belongs to an edge segment, and is small when it belongs to a non-edge segment.

The outputs $L_V$ and $L_W$ are inputted into the comparator 44. The comparator 44 issues signal "1" when the absolute value of the output $L_V$ is equal to or greater than the lightness threshold value, while issues signal "0" when the value is less than the threshold value. It also issues signal "1" when the absolute value of the output $L_W$ is equal to or greater than the saturation threshold value, while issues signal "0" when the value is less than the threshold value. The output of the comparator 44 is inputted into the OR circuit 45.

The OR circuit 45 produces a logical sum of the outputs of the comparator 44. Therefore, the target pixel finally is identified to be belonging to the edge segment when the signal "1" is detected based on at least either one of the lightness data V and the saturation data W. The identification result is inputted into the total judgment unit 33.

The reason why the edge detection is based on the lightness data V and the saturation data W is described.

Figure 12:
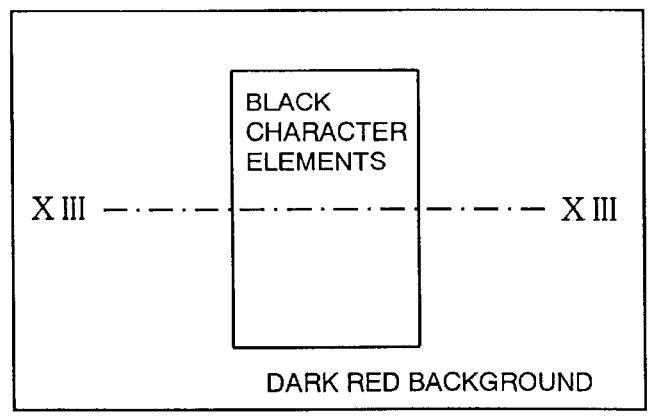
FIG. 12 is an example image having a dark red background and black character elements.
Figure 13A:
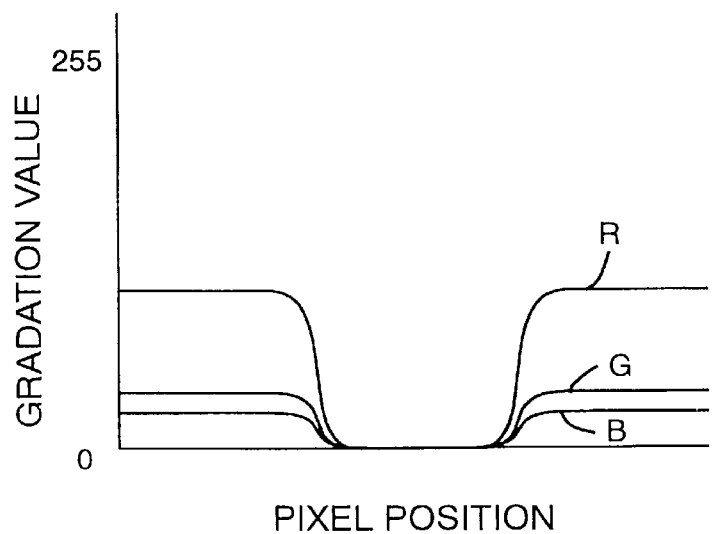
FIG. 13A and FIG. 13B are graphs of assistance in explaining the edge detection of the images shown in FIG. 12.

Now, an image having a dark red background and black character elements as shown in FIG. 12 is cited. FIG. 13A indicates the relation between the gradation value of the RGB-image data and the pixel position on line XIII—XIII in FIG. 12. The gradient of the R-image data is relatively large, while the gradients of the G-image data and the B-image data are extremely small.

Figure 13B:
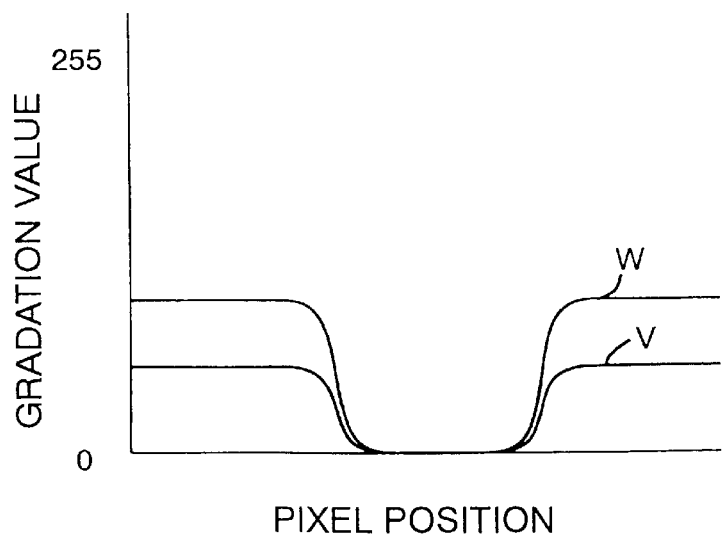

FIG. 13B indicates the relation between the pixel position and the saturation data W as well as the gradation values of the lightness data V. The gradient of the lightness data V that tends to be affected by the G-image data also tends to be extremely small. On the other hand, the saturation data W is affected by the value obtained by subtracting the lightness data V from the R-image data and the value obtained by subtracting the lightness data V from the B-image data. Consequently, the gradient of the saturation data W tends to be greater than the gradient of the lightness data V. Therefore, even in a case where the edge detection cannot be accomplished based on the lightness data V, the edge detection can be succeeded with a high accuracy based on the saturation data W.

More specifically, the gradation values of the lightness data V and the saturation data W are 44 and 72 assuming that the gradation values of the R-image data, the G-image data and the B-image data of the dark red background are 105, 20 and 5 respectively. Here, the coefficients $k_1$, $k_2$, and $k_3$ are assumed to be 0.3, 0.6 and 0.1 respectively. Since the gradation values of the R-image data, the G-image data and the B-image data of the black character elements are all zero, the gradation values of the lightness data V and the saturation data W are zero. Consequently, the gradient of the saturation data W becomes greater than the gradient of the lightness data V.

As described above, the edge detection is executed based on both the lightness data and the saturation data. Therefore, edges that cannot be detected based only on the lightness data can be detected. As a consequence, even in case of a colored image data, halftone elements and character elements in the halftone dot region can be separated with certainty. It is, thus, possible to apply the smoothing process only to the halftone elements to prevent the Moiré effect from occurring, apply the edge enhancement process only to the character elements, and reproduce the character elements more sharply.

It is obvious that this invention is not limited to the particular embodiments shown and described above but may be variously changed and modified without departing from the technical concept of this invention.

Although the detection by means of the black pixel detector is based on the RGB-image data, it can also be conducted based on the saturation data. More specifically, the target pixel is identified as black if the saturation data is equal to or smaller than the threshold value, while it is identified as color if the saturation data is greater than the threshold.

In embodiment 1, although it is described to use the RGB-image data for the edge detection, it is also possible to use the density data obtained by logarithmically converting the RGB-image data for the same purpose. It is also possible to use the value obtained by subtracting the minimum value data from the maximum value data is lieu of the maximum value data.

Figure 14:
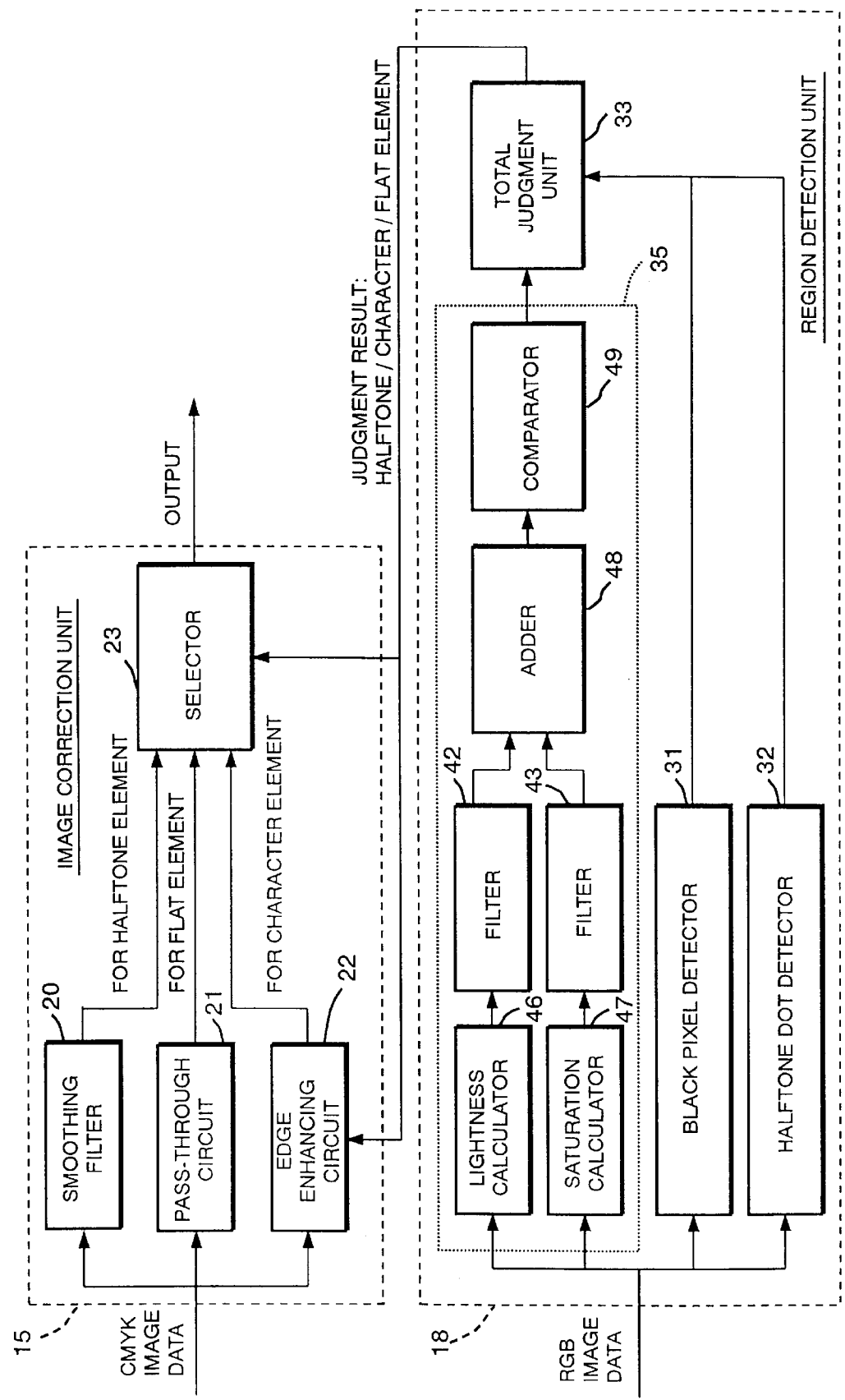
FIG. 14 is a block diagram of an image correction unit and a region detection unit according to a variation of embodiment 2.

In embodiment 2, although the absolute values of the gradients of the lightness data and the saturation data are used for the edge detection, it is also possible to use the sum of the absolute values of the gradients of the lightness data and the saturation data for the same purpose. For example, the edge detector 35 having the lightness calculator 46, the saturation calculator 47, the derivative filter 42, the derivative filter 43, an adder 48, and a comparator 49 as shown in FIG. 14 is applicable. Particularly, the adder 48 calculates the sum of the absolute values of outputs of the derivative filter 42 and the derivative filter 43, and inputs the sum into the comparator 49. The comparator 49 compares the sum with the threshold value and inputs the comparison result into the total judgment unit 33.

It is also possible to improve the edge detection accuracy for black character elements when the comparison between the absolute value of the gradient of the saturation data and the threshold is executed in relation to pixels whose lightness data are below a certain value.

Moreover, although digital copying machines are assumed as application examples in embodiments 1 and 2, the invention can be applied to image reading apparatuses for reading document images, such as scanners. More specifically, such applications are possible by providing a unit similar to the image processing unit of embodiments 1 and 2.

Figure 15:
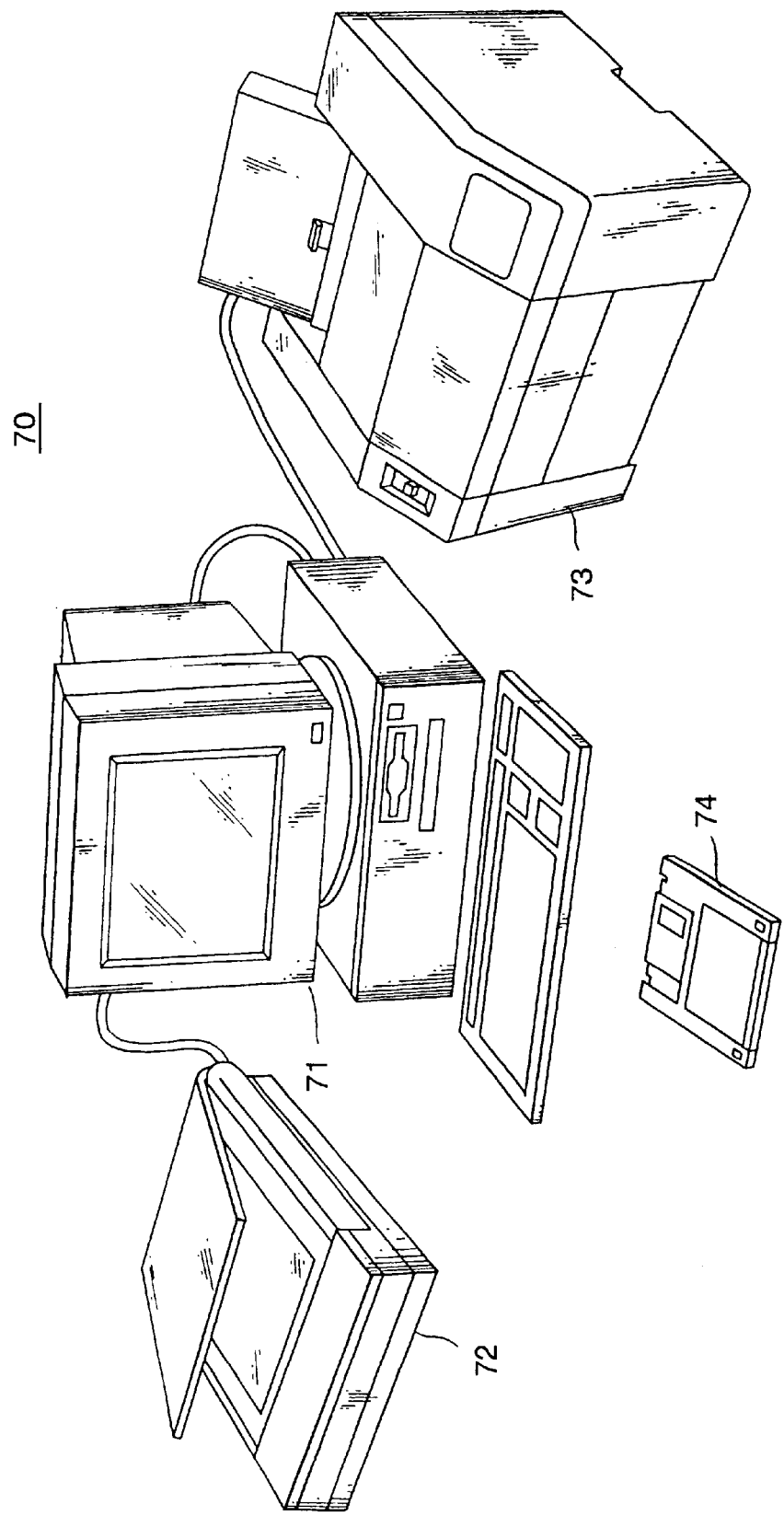
FIG. 15 is a perspective illustration of another embodiment of the invention.

Also, the invention can be applied to computers, including personal computers, by providing a computer program product that carries the programmed data corresponding to the operation sequence of the image processing unit. The computer program product includes the program and a storage medium carrying the program. More specifically, it is exemplified by a computer system 70 shown in FIG. 15. The computer system 70 consists of an image reader 72, a printer 73, and a personal computer 71. The computer 71 executes a predetermined process to the image data from the image reader 72 based on the program provided by a floppy disk 74 as the Program Product, and outputs the data thus obtained to printer 73.

What is claimed is:

1. An image processing apparatus for processing image data having a plurality of color components expressing an image, the apparatus comprising:
   a minimum selector for selecting a first set of image data for a minimum value color component from the image data having the plurality of color components;
   a maximum selector for selecting a second set of image data for a maximum value color component from the image data having the plurality of color components; and
   a detector for detecting an edge existing in the image based on the first and second sets of image data selected by said minimum selector and said maximum selector, respectively,
   wherein the detector comprises:
      a first edge detecting means for detecting the edge based at least in part on the first set of image data,
      a second edge detecting means for detecting the edge based at least in part on the second set of image data, and
      an OR circuit for issuing a certain output based on the edge being detected by at least one of said first edge detecting means and said second edge detecting means.

2. An apparatus according to claim 1, in which said second edge detecting means detects the edge based on a value resulting from subtracting the first set of image data from the second set of image data.

3. An apparatus according to claim 1, further comprising an edge enhancing circuit for enhancing image data corresponding to the edge detected by said detector.

4. An image processing method for detecting an edge segment existing in an image based on image data having a plurality of color components expressing the image, the method comprising:
   a minimum value data selecting step of selecting a first set of image data for a minimum value color component from the image data having the plurality of color components;
   a maximum value data selecting step of selecting a second set of image data for a maximum value color component from the image data having the plurality of color components; and
   a detecting step of detecting an edge existing in the image based on the first and second sets of image data selected in said minimum value data selecting step and said maximum value data selecting step, respectively,
   wherein said detecting step comprises:
      a first edge detecting step of detecting the edge based at least in part on the first set of image data,
      a second edge detecting step of detecting an edge based at least in part on the second set of image data, and
      an OR step of issuing a certain output based on the edge being detected in at least one of said first edge detecting step and said second edge detecting step.

5. A method according to claim 4, in which said second edge detecting step of detecting the edge is based on a value resulting from subtracting the first set of image data from the second set of image data.

6. A method according to claim 4, further comprising an edge enhancement step for enhancing image data corresponding to the edge detected by said detecting step.

7. A computer program product for detecting an edge segment existing in an image based on image data having a plurality of color components expressing the image, the product including computer-readable instructions for executing:
   a minimum value data selecting step for selecting a first set of image data for a minimum value color component from the image data having the plurality of color components;
   a maximum value data selecting step for selecting a second set of image data for a maximum value color component from the image data having the plurality of color components; and
   a detecting step for detecting an edge existing in the image based on the first and second sets of image data selected in said minimum value data selecting step and said maximum value data selecting step, respectively,
   wherein said detecting step comprises:
      a first edge detecting step of detecting the edge based at least in part on the first set of image data,
      a second edge detecting step of detecting an edge based at least in part on the second set of image data, and
      an OR step of issuing a certain output based on the edge being detected in at least one of said first edge detecting step and said second edge detecting step.

8. A product according to claim 7, in which said second edge detecting step of detecting the edge is based on a value resulting from subtracting the first set of image data from the second set of image data.

9. A product according to claim 7, further executing an edge enhancement step for enhancing image data corresponding to the edge detected by said detecting step.

* * * * *